Oct. 20, 1953     O. P. HAEGELE     2,655,718
MACHINE FOR ASSEMBLING ROLLERS
Filed July 1, 1947     8 Sheets-Sheet 2
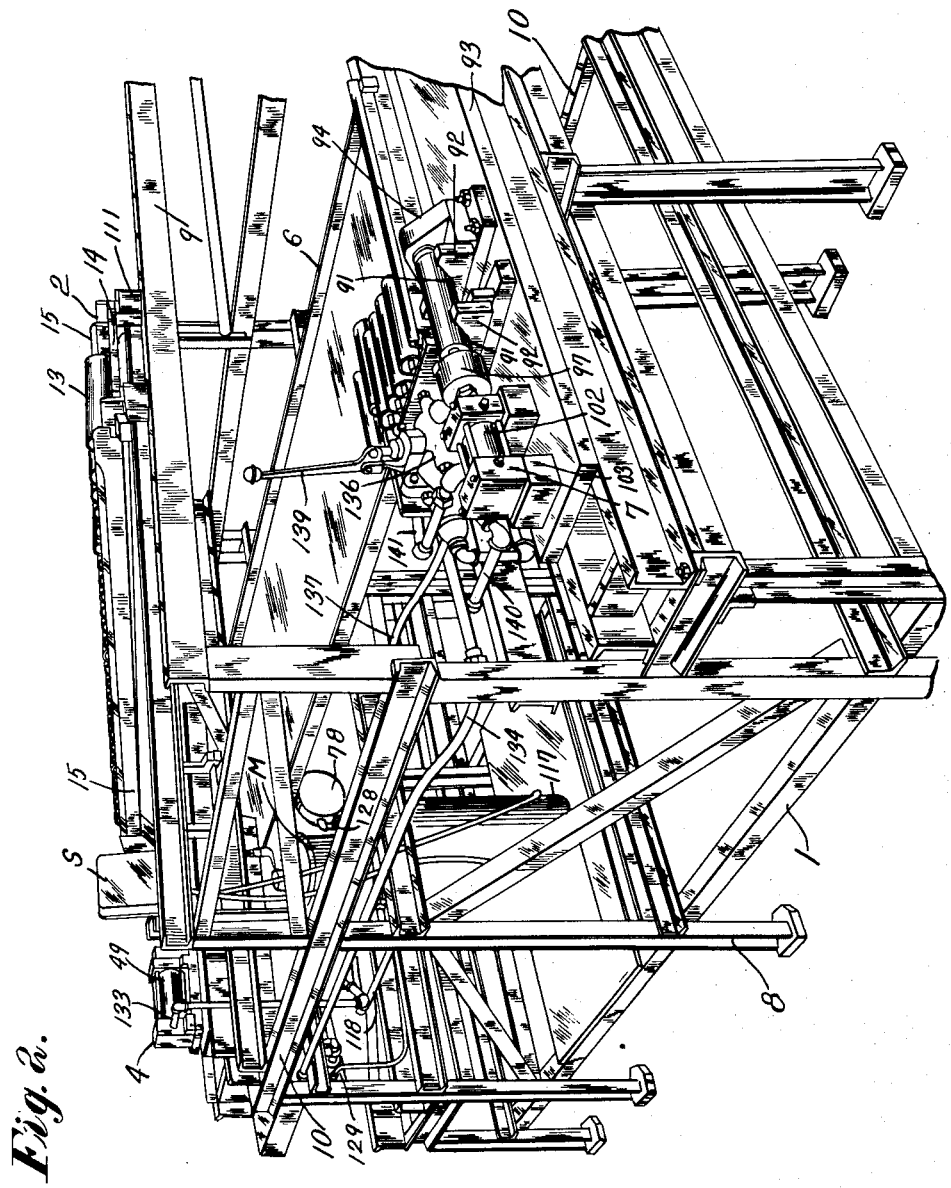
Inventor:
Otto P. Haegele.
by Charles F. Osgood,
Attorney.

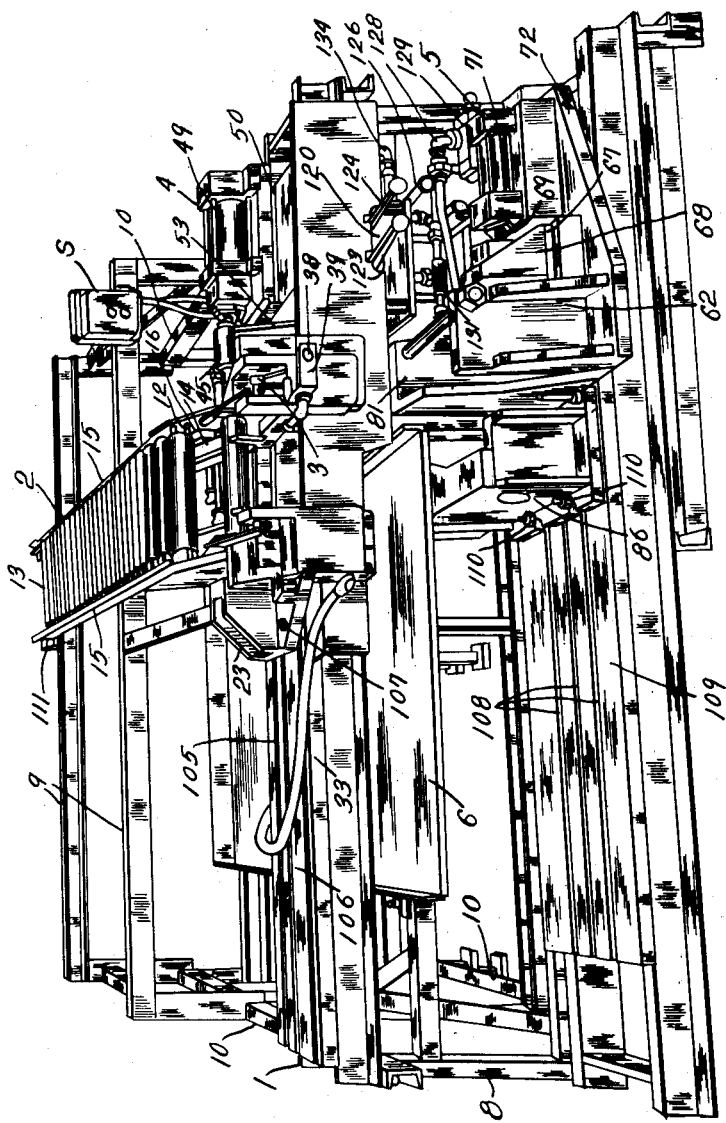

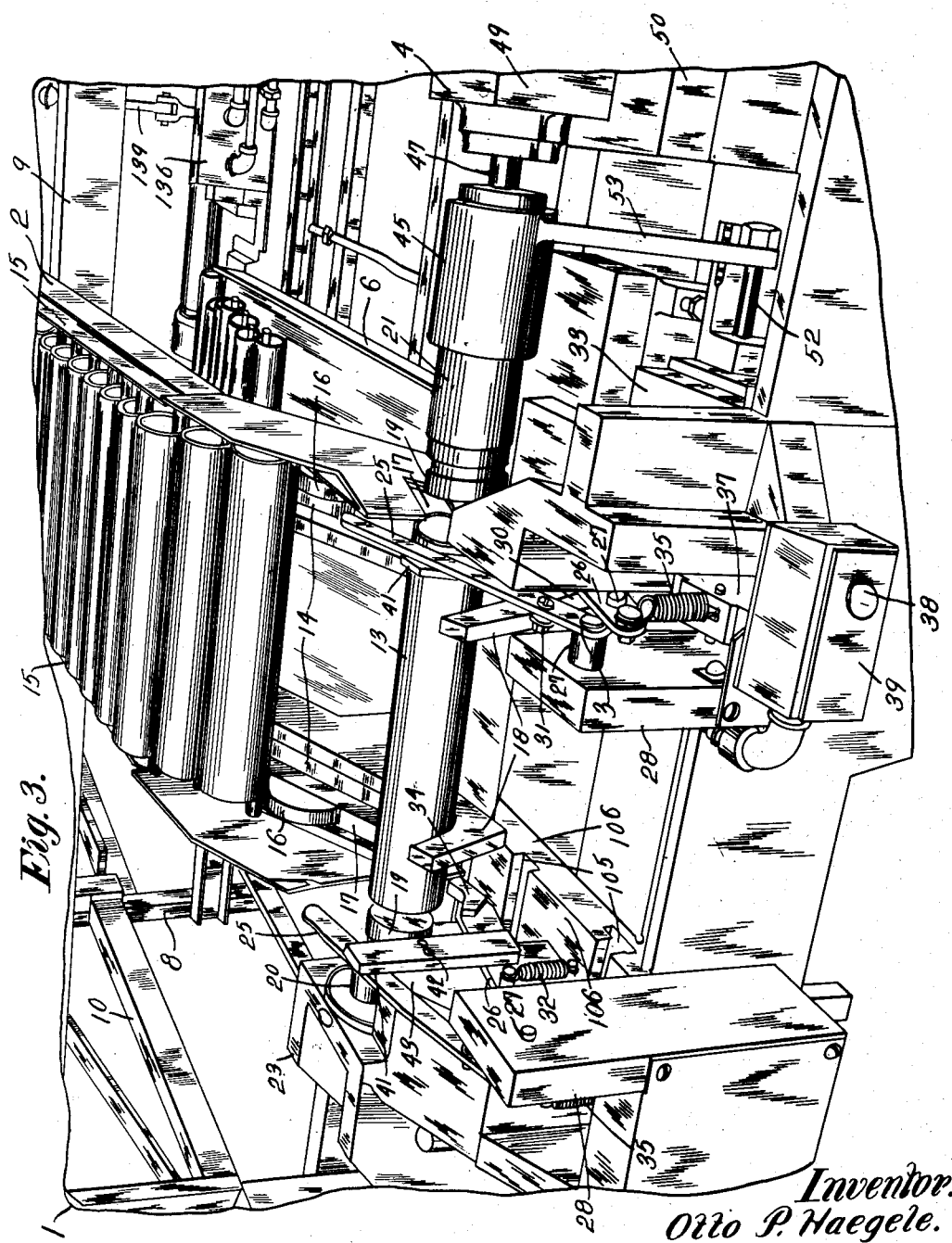

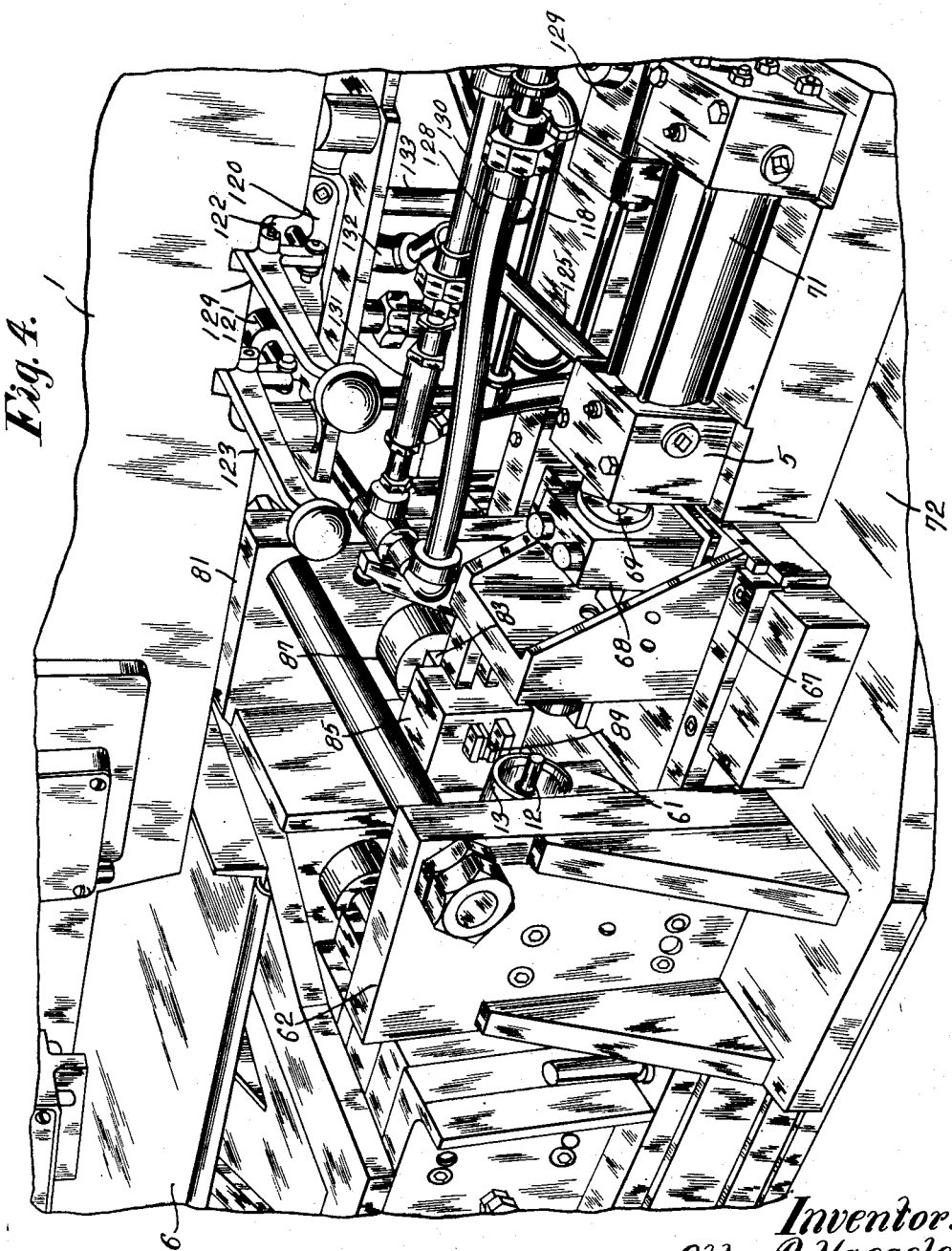

Oct. 20, 1953     O. P. HAEGELE     2,655,718
MACHINE FOR ASSEMBLING ROLLERS
Filed July 1, 1947     8 Sheets-Sheet 5
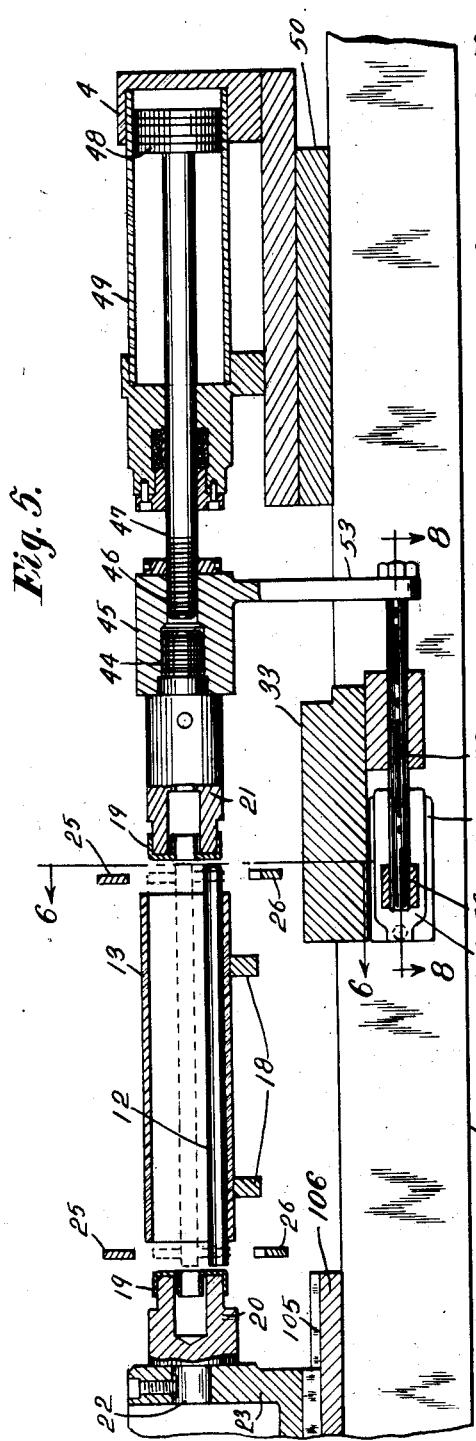
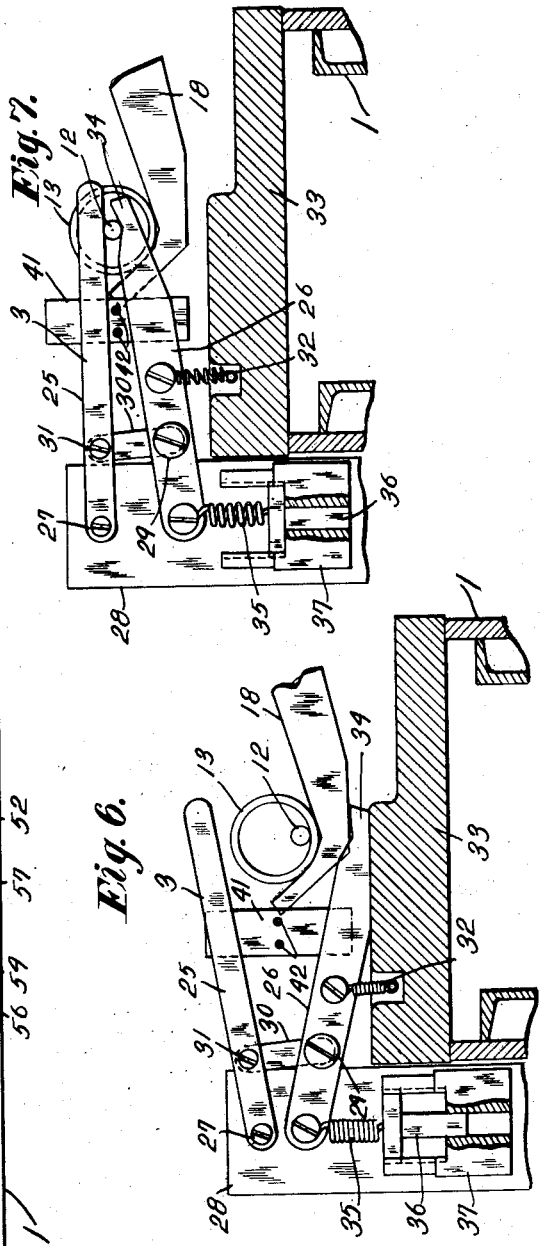
*Inventor:*
*Otto P. Haegele.*
by *Charles F. Osgood,*
*Attorney.*

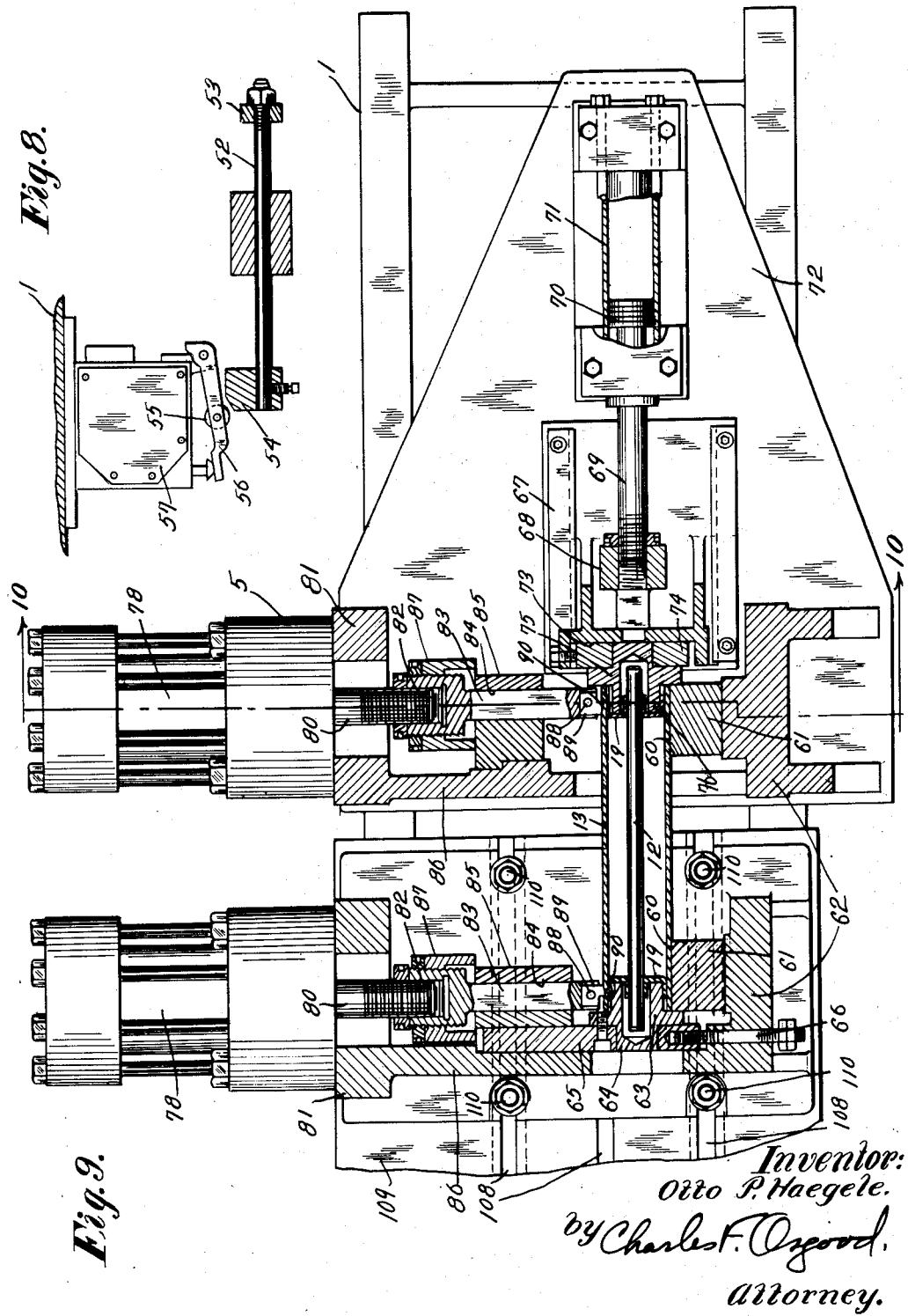

Oct. 20, 1953  O. P. HAEGELE  2,655,718
MACHINE FOR ASSEMBLING ROLLERS
Filed July 1, 1947  8 Sheets-Sheet 7

Inventor:
Otto P. Haegele.
by Charles F. Osgood,
Attorney.

Oct. 20, 1953   O. P. HAEGELE   2,655,718
MACHINE FOR ASSEMBLING ROLLERS
Filed July 1, 1947   8 Sheets-Sheet 8

Inventor:
Otto P. Haegele.
by Charles F. Osgood,
Attorney.

Patented Oct. 20, 1953

2,655,718

UNITED STATES PATENT OFFICE 2,655,718

MACHINE FOR ASSEMBLING ROLLERS

Otto P. Haegele, Columbus, Ohio, assignor to Joy Manufacturing Company, a corporation of Pennsylvania Application July 1, 1947, Serial No. 758,416

8 Claims. (Cl. 29—201)

This invention relates to an idler roller assembly machine and more particularly, but not exclusively, to a machine for assembling the parts of a belt idler roller especially designed for use with endless belt conveyors.

In the assembling of belt idlers, it has heretofore been the custom manually to assemble the parts by separate operations, a relatively costly and time-consuming task. In such belt idlers, the roller shafts were heretofore first inserted within the tubular roller, then the end shaft supports were placed in position within the ends of the bore of the roller, as by a hand press, and, finally, after the bearing units were previously assembled, the bearing units were pressed, as by a hand press, on the ends of the roller shaft; and these assembling steps were accomplished manually by separate operations, frequently requiring transport of parts from one machine to another until final assembly was effected. The present invention contemplates improvements over existing known methods of assembling belt idlers by the provision of a machine whereby the several steps above outlined are accomplished by power devices so that the time consumed in and expense of assembly of the parts are substantially decreased. The machine is simple in construction and is easily controllable, and embodies automatic devices for quickly and effectively performing certain of the steps of assembly.

It is an object of the present invention to provide an improved belt idler assembly machine. Another object is to provide an improved belt idler assembly machine which is power operated and controlled. A further object is to provide an improved machine for assembling the parts of an idler roller and for securing certain of the parts in position. Yet another object is to provide an improved unitary assembly machine embodying a conveyor for conveying the idler rollers and shafts toward a position wherein the end supports for the shaft are positioned into the tubular roller and a conveyor for thereafter conveying the partially assembled rollers toward a position wherein the other roller parts are placed in assembled relation with respect to the roller shaft. Still another object is to provide an improved belt idler assembly machine having improved fluid operated actuating devices and improved control means therefor. A further object is to provide an improved power device for first effecting one assembling operation and a power device for thereafter effecting another assembling operation, together with improved automatic control means for first effecting operation of the first power device and thereafter automatically effecting operation of the second power device whereby such operations occur in a definite sequence. Another object is to provide an improved power operated device for pressing the end shaft supports or end sleeves into the tubular idler rollers and an improved power operated device for pressing the bearing units onto the projecting ends of the roller shaft. Yet another object is to provide an improved belt idler assembly machine having improved means for automatically centering the idler shaft with respect to the tubular roller prior to the insertion of the end shaft supports or end sleeves within the idler roller. Another object is to provide an improved electrical control apparatus for the automatic centering means for the roller shaft so that until the end shaft supports or end sleeves are initially received within the rollers, said centering means will remain in cooperative relation with the roller shaft but will be automatically moved out of the way before the end sleeves are finally pressed home in the ends of the roller. A still further object is to provide an improved means for crimping or indenting the ends of the idler rollers to hold the end shaft supports or end sleeves securely in position within the rollers. A still further object is to provide an improved belt idler assembly machine having adjustable structures whereby rollers of different diameters and of different lengths may be assembled within the machine. Still another object is to provide an improved belt idler assembly machine having a novel arrangement and combination of parts. These and other objects and advantages of the invention will, however, hereinafter more fully appear.

In the accompanying drawings there is shown for purposes of illustration one form which the invention may assume in practice.

In these drawings:

Fig. 1 is a front perspective view of a belt idler assembly machine constructed in accordance with a preferred illustrative embodiment of the invention.

Fig. 2 is a rear perspective view, with parts broken away, of the machine shown in Fig. 1.

Fig. 3 is an enlarged fragmentary perspective view of the upper front portion of the machine, showing details of construction.

Fig. 4 is an enlarged fragmentary perspective view of the lower front portion of the machine, viewed from a different angle.

Fig. 5 is a transverse vertical sectional view taken through the fluid cylinder and associated mechanism for inserting the end shaft supports in the tubular roller.

Fig. 6 is a vertical sectional view taken substantially on line 6—6 of Fig. 5, illustrating a portion of the automatic shaft centering means.

Fig. 7 is a sectional view, similar to Fig. 6, showing parts of the centering means in a different position.

Fig. 8 is a horizontal sectional view taken substantially on line 8—8 of Fig. 5, showing the solenoid control switch.

Fig. 9 is a horizontal sectional view showing the fluid cylinders and associated mechanism for crimping or indenting the idler rollers to secure the end shaft supports in place.

Figures 10, 11:
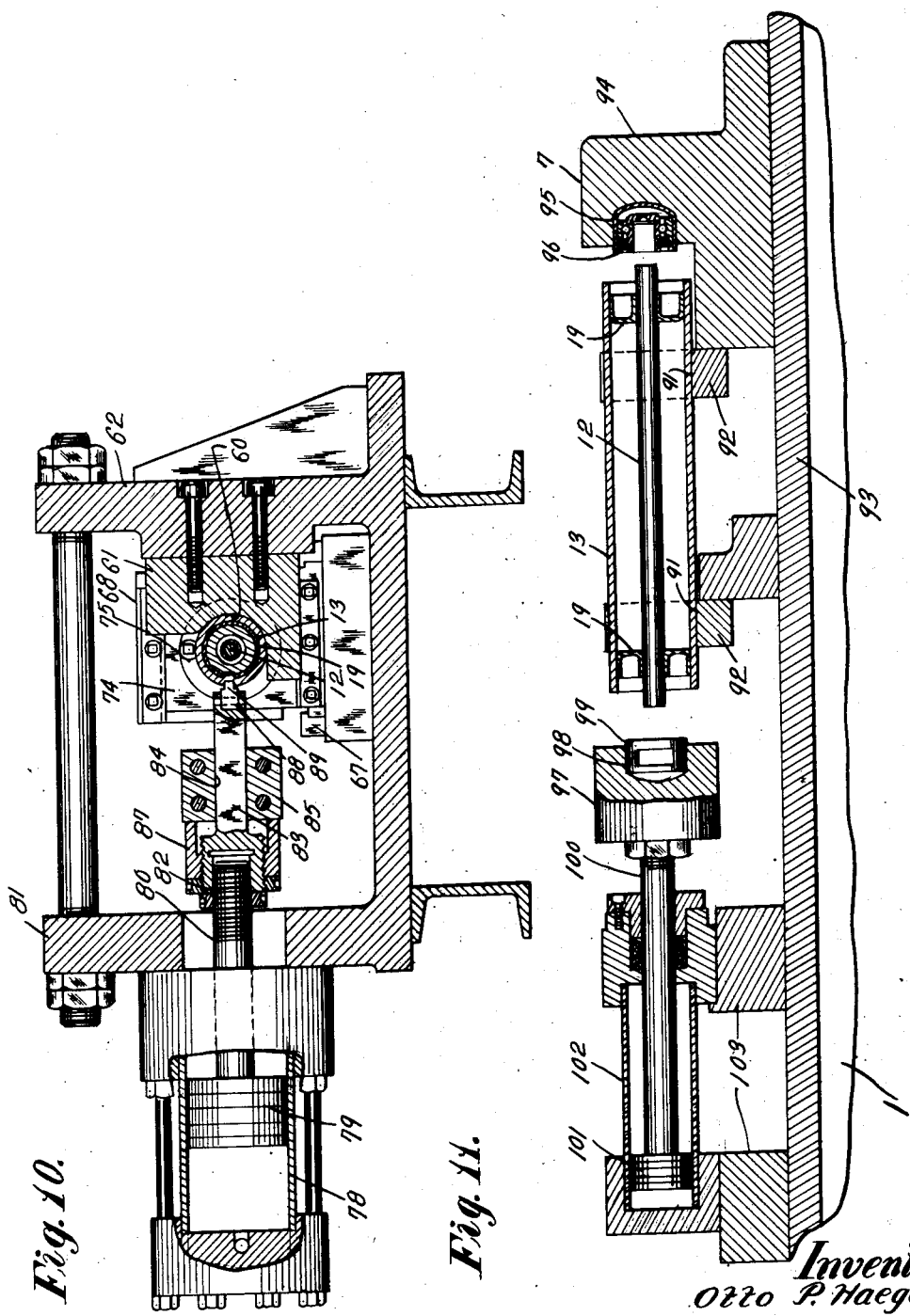
Fig. 10 is a longitudinal vertical sectional view taken substantially on line 10—10 of Fig. 9.
Fig. 11 is a transverse vertical sectional view taken through the fluid cylinder and associated mechanism for inserting the bearing units onto the projecting ends of the roller shaft.

In this illustrative construction, as shown in the drawings, the improved belt idler assembly machine generally comprises a fabricated framework 1 having supported at the top thereof an upper inclined gravity conveyor 2 for conveying the rollers and shafts to the front of the machine into a position to be partially assembled, an automatic centering device 3 for centering the roller shaft with respect to the idler roller, a fluid cylinder and associated mechanism 4 for inserting the end shaft supports in the tubular roller, fluid cylinders and associated mechanism 5 for crimping or indenting the rollers to secure the end shaft supports securely in place therein, a lower inclined gravity conveyor 6, supported by the framework, for conveying the partially assembled rollers to the rear of the machine into a position to have their assembly completed, and a fluid cylinder and associated mechanism 7 for inserting the bearing assemblies onto the projecting ends of the roller shafts. Evidently, while the machine outlined above is especially designed for use in assembling belt idlers, mechanisms other than belt idlers may be assembled thereon if desired.

Now referring to the specific structure of the machine, it will be observed that the framework 1 includes uprights 8 provided with floor or base engaging feet, horizontal cross members 9, and longitudinal members 10. These uprights and members are suitably diagonally braced and are secured in assembled relation as by welding. The inclined top gravity conveyor 2 is supported by two upper cross members and is inclined forwardly and downwardly, and after the roller shafts 12 have been placed within the tubular roller elements 13, the latter are placed on the conveyor 2 so that they may roll by gravity along the side guides 14 of the conveyor between vertical side plates 15 of the conveyor toward the front of the machine. When the roller elements reach the front lower end of the conveyor, they are stopped by upstanding abutments 16, 16 on downwardly inclined side frame members 17, as shown in Fig. 3. The operator may then pick up the bottom roller element and transfer it onto bottom supports 18 having upstanding inclined ends which provide a cradle for the roller during its assembly, with the roller element located as shown in Fig. 6 and with the roller shaft within the roller element resting on the bottom of the inner wall thereof in the manner shown. If desired the roller elements 13 may be moved over the stop abutments 16 and rolled along the frame members 17 toward the cradle without bodily lifting of the roller elements. Prior to the placing of the roller and shaft on the supports 18, cuplike end shaft supports or end sleeves 19 may be placed on circular end supports 20 and 21, herein arranged in axial alinement in the manner shown in Fig. 5. The support 20 is stationary and has a shaftlike projection 22 fitted in a bore in an adjacent frame 23 (which is adjustable as later explained), and held therein as by a set screw. The other support 21 is movable and power actuated, as will later be explained. After the end sleeves 19 are properly positioned on their respective supports, and the rollers placed on the cradle 18, the roller shaft may be centered with respect to the roller by the automatic centering means 3, to be now described in detail.

Figure 13:
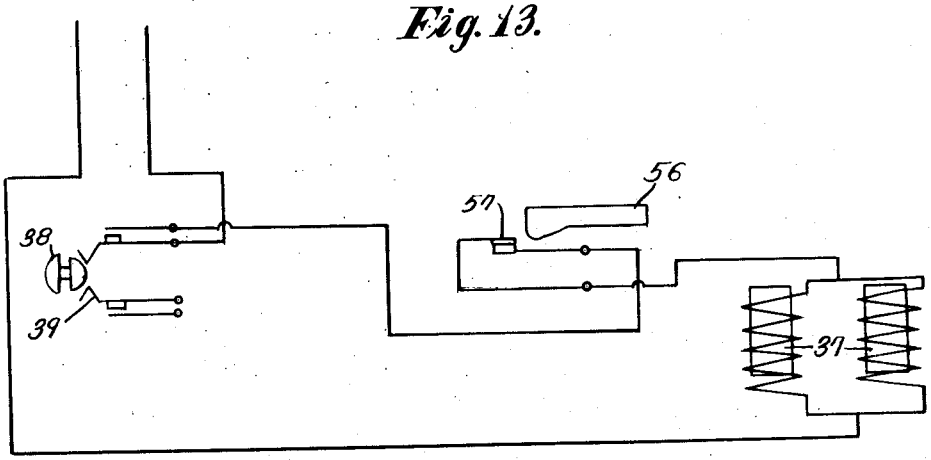
Fig. 13 is an electrical diagram, showing the control circuit for the solenoids which operate the automatic shaft centering means.

The automatic centering means 3 comprises a pair of relatively vertically movable pivoted centering arms 25 and 26 at each end of the roller just inside of the end supports 20 and 21. The upper arm 25 of each pair is pivoted at 27 on a vertical plate 28 suitably mounted on the framework. One of the plates 28 is secured to the adjustable frame 23 for a purpose to be later explained, while the other plate 28 is rigid with the framework. The lower arm 26 of each pair is pivotally mounted at 29 at the lower end of a floating link 30, with the upper end of the link pivotally connected at 31 to the upper arm 25. Springs 32 are connected between a bed frame 33 secured to the framework and the lower arms 26 for urging the notched fingerlike shaft-engaging ends 34 of the lower arms downwardly to the released position shown in Figs. 5 and 6. The opposite ends of the lower arms 26 are connected by springs 35 to the power actuated elements of a power device, herein preferably to the movable cores 36 of solenoids 37. When the operator presses inwardly on a push button 38 of a normally open starting switch 39 (see Fig. 13), the solenoids are energized to move the cores 36 downwardly from the position shown in Fig. 6, so as to swing the lower arms 26 about their pivotal mountings on the floating links 30, thereby to bring the notched ends 34 of the lower arms upwardly so that the projecting ends of the roller shaft 12 are received in the notches thereof; and as the arms are swung upwardly, the shaft is lifted toward its centered position with respect to the roller. As the notched ends of the lower arms are swung upwardly, the upper arms are concurrently swung downwardly about their pivots 27 so that when the fingerlike ends of the arms assume the position shown in Fig. 7, the roller shaft 12 is centered with respect to the tubular roller 13 and is held centered so long as the operator holds the starting switch 39 closed. Vertical plates 41 are secured, as by screws 42, to adjacent vertical side frame portions 43 of the framework, and the centering arms are guided at their inner surfaces by these plates during swinging movement thereof. The left hand plate 41, shown in Fig. 3, is secured to the adjustable frame 23 for a purpose to be later explained; while the right hand plate 41 is rigidly secured to the framework.

As above referred to, the support 21 is movable and is threadedly secured at 44 (Fig. 5) to a member 45, in turn threadedly secured at 46 to the outer end of a piston rod 47 of a reciprocable piston 48, the latter contained in a horizontal fluid cylinder 49 suitably secured to a horizontal plate 50 of the framework. When the roller shaft 12 is in its centered position with respect to the roller 13 (as shown in dotted lines in Fig. 5 and in full lines in Fig. 7) the piston 48 may be moved under the influence of pressure fluid toward the left, as viewed in Fig. 5, to press the right hand end sleeve 19 a slight distance onto the right hand end of the roller shaft and concurrently to move the roller shaft axially to press its left hand end a slight distance into the bore of the left hand end sleeve 19. When the end shaft supports 19 are initially positioned on the ends of the roller shaft, a rod 52, secured to a projection 53 integral with the member 45 and guided on the framework, is moved to a position wherein a cam 54 (see Fig. 8), fixed as by a set screw to the rod, engages a roller 55 on a lever 56 of a normally closed switch 57, opening the latter to break the circuit between the hand switch 39 and the solenoids 37, thereby to deenergize the latter, causing the springs 32 to move the centering arms 25 and 26 quickly to their wide open position as shown in Fig. 6. Thus, as the end sleeves 19 are initially pressed into the ends of the roller, the centering arms automatically move out of the way so that as the piston 48 continues to move under the influence of pressure fluid, the end sleeves 19 are pressed tightly into the ends of the bore of the roller. The partially assembled roller may then be removed from the cradle 13 and placed on curved seats 60 of spaced vertical blocks 61 of the crimping mechanism 5, the blocks secured as by screws to vertical frame portions 62 on the frame (Fig. 10). In Fig. 4, the roller is shown in seated position; and when the roller is placed in seated position, its left hand end sleeve 19, as viewed in Fig. 9, is placed over a cylindrical portion 63 of a support 64, secured as by screws to an adjustable plate 65. This plate is guided for horizontal adjustment on an adjustable part of the frame, as later described, and is provided with an adjusting screw 66. At the right hand end of the roller, as viewed in Fig. 9, is a horizontal transverse guideway 67 extending lengthwise of the roller and in which a sliding crosshead 68 is guided for horizontal movement, and this crosshead is secured to a piston rod 69 of a reciprocable piston 70 contained in a horizontal fluid cylinder 71, the latter being suitably secured to a horizontal frame portion 72 of the framework. Guided at 73 for transverse adjustment, as by adjusting screws, on the crosshead, is a vertical plate 74 carrying a member 75 provided with a cylindrical portion 76 adapted to fit within the right hand end sleeve 19 of the roller, as viewed in Fig. 9, when the piston 70 has moved toward the left under the influence of pressure fluid to bring the crosshead 68 into the position shown. In Fig. 4, the crosshead and crimping tools are shown in retracted position. Thus, when the cylindrical portions 63 and 76 of the members 64 and 75 are positioned within the end sleeves of the roller, as shown in Fig. 9, the roller is firmly maintained in position. Arranged longitudinally of the framework at substantially right angles to the longitudinal axis of the roller are horizontal fluid cylinders 78, 78, arranged in parallel relation and containing reciprocable pistons 79 (see also Fig. 10) having piston rods 80. These cylinders are secured to vertical frame portions 81 parallel to the frame portions 62, and the upper ends of the right hand frame portions, as viewed in Fig. 4, are held rigidly in spaced relation as by spacing sleeves and bolts, as shown. Threadedly secured at 82 to the outer ends of the piston rods are tool holders 83 guided in horizontal guideways 84 in blocks 85 rigidly secured, as by screws, to adjacent portions 86 mounted on the framework. The adjustable plate 65 (Fig. 9) is guided on the left hand frame portion 86, which is adjustable, as later explained. Adjustable stops 87, threaded on the bodies of the tool holders, engage the outer surfaces of the guide blocks 85 for limiting the rectilinear inward movement of the tool holders. Lock washers suitably hold the adjustable parts in position, as shown. Attached at 88 to the inner ends of the tool holders are crimping or indenting tools 89. When the pistons 79 are moved outwardly under the influence of pressure fluid, the tools 89 are pressed inwardly against the outer surface of the roller to crimp or indent the latter, as at 90 (Fig. 9), to secure firmly the end shaft supports 19 within the ends of the roller bore. By proper adjustment of the plates 65 and 74 and by interchanging the seat-providing blocks 61 with different size blocks and interchanging the support members 64 and 75 with different size ones, rollers of different diameters may be supported in crimping position and crimped in an obvious manner. When the work holders and crosshead are retracted, as shown in Fig. 4, the partially assembled roller may be removed from the seats 60 on the blocks 61 and placed on the lower conveyor 6, where it rolls by gravity downwardly toward the back of the machine, and the conveyor has a bottom wall to provide a stop for the roller when it reaches the bottom of the conveyor.

The partially assembled roller may be removed from the conveyor and placed on generally V-shaped seats 91 of vertical blocks 92 of the bearing assembling mechanism 7; these blocks being carried by a horizontal plate 93 of the framework. An end support 94, also secured to the plate at the right hand end of the roller, as viewed in Fig. 11, has a circular recess 95 for receiving a bearing unit 96, which may be similar to that disclosed in the C. N. Bebinger Patent No. 2,266,300, patented December 16, 1941. A horizontally movable support 97 at the left hand end of the roller has a circular recess 98, coaxial with the recess 95, for receiving a similar bearing unit 99. The movable support 97 is aligned with the bearing receiving recesses and is secured to a piston rod 100 of a reciprocable piston 101 contained in a horizontal fluid cylinder 102 secured to blocks 103 carried by the horizontal plate 93. When the piston 101 is moved toward the right in Fig. 11 under the influence of pressure fluid, the left hand bearing unit 99 is pressed tightly onto the left hand end of the roller shaft 12, and the roller shaft is concurrently moved axially toward the right to press its right hand end into the right hand bearing unit 96. The completely assembled belt idler roller may then be removed from the machine.

In order to accommodate rollers of different lengths than those shown, the adjustable frame 23 which carries the left hand support 20, as viewed from the front of the machine, is slidable transversely along horizontal guideways 105 on a transverse bed frame 106 secured to the framework, and suitable bolts 107 are provided for securing the slidable frame 23 in adjusted position.

Also, the left hand lower frame 86 (Fig. 9), supporting the left hand crimping cylinder 78 and the roller support member 64, is slidable transversely along horizontal guideways 108 on a transverse bed frame 109, likewise secured to the framework, and suitable bolts 110 are likewise provided to secure the frame in adjusted position. The left hand side guide 14 and side frame 15 of the upper conveyor 2 is rigidly supported at its forward end on the adjustable frame 23 so that the conveyor side frames may be relatively adjusted different distances apart to accommodate rollers of different lengths, and the rear end of this adjustable side frame of the conveyor is preferably supported by a sliding block 111 which is guided by the rear upper cross member 9 of the framework. Suitable clamping devices, such as clamping bolts, for this rear sliding block may be provided, if desired, to secure the block in adjusted position to the cross member. Since the left hand centering arms 25 and 26 in Fig. 5 are mounted on the plate 28 which is secured to the adjustable frame 23, the pairs of arms move relative to each other during adjustment of the frame, so that centering of shafts and rollers of different lengths may also be effected. Thus, rollers of different lengths, as well as rollers of different diameters, may be assembled within the machine. It will be noted that the lower roller conveyor 6 is made of sufficient width to accommodate the rollers of greatest length.

Figure 12:
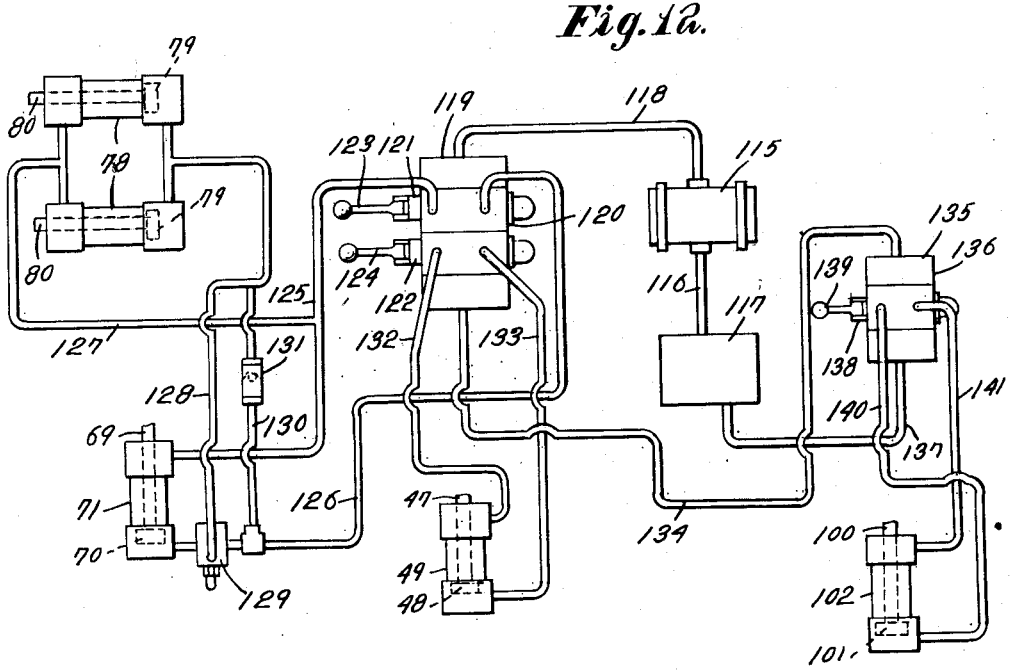
Fig. 12 is a diagrammatic view illustrating the hydraulic fluid system.

Now referring to the hydraulic fluid system, as shown diagrammatically in Fig. 12, it will be noted that a conventional motor driven pump 115 has its intake connected by a conduit 116 to a tank 117 adapted to contain a fluid, preferably a liquid such as a light lubricating oil. While the pump in the diagram is shown outside of the tank, in the actual machine it is located within the tank; and the motor, designated M in Fig. 2, is supported at the top of the tank. The motor has a conventional starting switch S located at the front of the machine (Fig. 1). The pump discharge is connected by a conduit 118 to the supply passage of a valve box 119 of a conventional control valve mechanism 120, herein mounted on the framework at the front end of the machine, in the manner clearly shown in Figs. 1 and 4. The valve block has horizontal bores containing conventional slide valves 121 and 122, preferably of the balanced spool type and respectively having operating levers 123 and 124. The bore containing the slide valve 121 is connected by conduits 125 and 126 to the opposite ends of the roller holding cylinder 71, and branch conduits 127 and 128 lead from the conduits 125 and 126 respectively, to the opposite ends of the crimping cylinders 78. The conduit 128 is connected to the conduit 126 through a conventional spring loaded valve 129 which remains closed, cutting off communication of the conduit 128 with the conduit 126 until the piston in the cylinder 71 has moved its full distance. When the pressure builds up in the cylinder 71 due to cessation of piston movement, the valve 129 automatically opens, admitting fluid through conduit 128 to the cylinders 78, thereby to move the pistons therein toward crimping position. It will thus be seen that the cylinder 71 is first operated firmly to hold the roller in crimping position and thereafter, in a definite sequence, the cylinders 78 are operated to effect crimping. The conduit 128 is connected through a conduit 130 controlled by a check valve 131 to the conduit 126 so that when the latter is vented, fluid may flow from the cylinders 78 through conduit 130, past the check valve 131 to the conduit 126, wholly independently of the valve 129 which is, at that time, closed. Fluid may flow to the conduit 128 only past the relief valve 129. The valve box bore containing the slide valve 122 is connected by conduits 132 and 133 to the opposite ends of the cylinder 49. The discharge passage of the valve box 119 is connected by a conduit 134 to the supply passage of a valve box 135 of a conventional control valve mechanism 136, herein supported by the framework at the rear end of the machine, as shown in Fig. 2. The discharge passage of this valve box is connected by a conduit 137 back to the tank 117. The valve box 135 has a bore containing a conventional slide valve 138, herein likewise preferably of the balanced spool type and having an operating lever 139. The valve box bore containing the valve 138 is connected by conduits 140 and 141 to the opposite ends of the cylinder 102. Thus, by suitable control of the several fluid cylinders by the slide valves, the various assembling operations may be effected in the proper manner.

When it is satisfactory not to have it possible to utilize the mechanisms at the opposite ends of the apparatus at the same time, it will suffice to have "free flow" and pressure line connections in free communication with each other in the valve box head to which the pressure line 118 discharges, and to have "free flow" and exhaust connections freely communicate in the valve mechanism end box from which the line 134 leads. Regardless of whether operation concurrently, or only separately, at the opposite ends of the apparatus is desired, the end box from which the line 137 leads may have "free flow" and exhaust connections in constant communication. It it is desired to have the mechanisms at opposite ends of the apparatus capable of being used concurrently, two changes from what the drawings show would be made. The exhaust and "free flow" connections would be separated in the valve box from which the line 134 is shown leading, and there would be provided a direct return line for the exhaust fluid to the tank 117. Moreover, in the box to which the line 134 leads, the "free flow" connection, still connected with the line 134, would be separated from the supply connection, and a separate supply line would be led from the line 118 to the supply connection in the box mentioned. It will be understood that the valve devices 121, 122 and 138 are of a character which, in neutral position, permit free flow through them, but, when displaced to effect the supply of fluid to mechanism to be controlled thereby, interrupt the free flow which previously prevailed. Any suitable conventional structure for these valve mechanisms may be employed and various ones are known in the commercial field.

As a result of this invention, an improved belt idler assembly machine is provided whereby assembly of the idler parts may be quickly and easily accomplished with a minimum of time and expense. It will further be evident that by the provision of the fluid operated devices for assembling the idler parts, together with the improved control means therefor, an extremely flexible and and reliable mechanism results. The automatic centering means for holding the roller shaft centered with respect to the roller during the assembling operation, together with the improved control means for effecting automatic release of the centering means to prevent jamming as the parts are moved into place, greatly facilitates the assembling operation. By the provision of the automatic control for the crimping mechanism, the roller is always firmly held in position prior to the crimping operation, in a definite sequence. By the provision of the adjustable and interchangeable roller supporting and centering structures, rollers of different diameters and lengths may be assembled within the machine. The machine is relatively simple and rugged, well adapted to meet the demands of service. Other uses and advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In an assembling machine for an idler which comprises cooperating parts, a support for a tubular idler roller having a roller shaft extending therethrough, devices for moving said roller shaft into centered relation with respect to said tubular roller, supports at the opposite ends of said roller for receiving end supporting sleeves for said roller shaft, and power operated means for moving said end supports toward one another to press said end sleeves into assembled relation with respect to said shaft and said roller thereby to maintain said shaft centered with respect to said roller.

2. In an assembling machine for an idler which comprises cooperating parts, a support for a tubular idler roller having a roller shaft extending therethrough, devices for moving said roller shaft into centered relation with respect to said tubular roller, supports at the opposite ends of said roller for receiving end supporting sleeves for said roller shaft, and power operated means for moving said end supports toward one another to press said end sleeves into assembled relation with respect to said shaft and said roller, said centering means including relatively swingable centering arms engageable with the projecting ends of said roller shaft beyond the ends of said roller.

3. In an assembling machine for an idler which comprises cooperating parts, a support for a tubular idler roller having a roller shaft extending therethrough, devices for moving said roller shaft into centered relation with respect to said tubular roller, supports at the opposite ends of said roller for receiving end supporting sleeves for said roller shaft, power operated means for moving said end supports toward one another to press said end sleeves into assembled relation with respect to said shaft and said roller, said centering devices including relatively swingable centering arms engageable with the projecting ends of said roller shaft beyond the ends of said roller, and power operated means for swinging said arms about their pivots to move the same into centering position.

4. In an assembling machine for an idler which comprises cooperating parts, a support for a tubular idler roller having a roller shaft extending therethrough, devices at the opposite ends of the roller for moving said roller shaft into centered relation with respect to said tubular roller, supports at the opposite ends of said roller for receiving end supporting sleeves for said roller shaft, power operated means for moving said end supports toward one another to press said end sleeves into assembled relation with respect to said shaft and said roller, power operated means for actuating said centering devices, and means actuated upon a predetermined movement of said first mentioned power operated means for automatically controlling said second mentioned power operated means to effect release of said centering devices.

5. In an assembling machine for an idler which comprises cooperating elements, the combination comprising means for supporting a tubular idler element through which another idler element extends, means engageable with said second idler element for moving the same into and for holding the same in centered relation with respect to said first element, power operated means including a movable member arranged in alinement with said first element for effecting assembly of other elements with respect to said first and second elements whereby said second element is maintained in coaxial relation with said first element, and means automatically effective upon a predetermined movement of said movable member of said power operated means for effecting release of said centering means to move the latter out of the path of said movable member prior to complete assembly of said idler elements.

6. In an assembling machine for an idler which comprises cooperating elements, the combination comprising means for supporting an idler element through which another idler element extends, means engageable with said second element for moving the same into and for holding the same in centered relation with respect to said first element, power operated means including a movable member arranged in alinement with said first element for effecting assembly of other idler elements with respect to said first and second elements whereby said second element is maintained in coaxial relation with said first element, and means automatically effective upon a predetermined movement of said movable member of said power operated means for effecting release of said centering means to move the latter out of the path of said movable member prior to complete assembly of said elements, said centering means including relatively movable centering members engageable with said second element and movable into the path of said power operated means when said second element is centered, and a power actuator for moving said centering members, and said automatic release means including a control device for controlling the operation of said actuator and an operating element actuated upon movement of said movable member of said power operated means for operating said control device.

7. In an assembling machine for an idler roller which comprises cooperating parts, adjustable supporting means for supporting idlers of different lengths comprising end supports, one adjustable laterally relative to the other to vary their distance apart, means for securing said adjustable part in a stationary position during the assembling operation, means for automatically centering parts of the roller during assembly thereof including centering devices respectively mounted on said end supports, one of said centering devices being adjustable with said adjustable one of said end supports to vary the distance between said centering devices whereby said centering devices may act on rollers of different lengths supported by said supporting means, supporting means carried by said relatively adjustable end supports for supporting additional roller parts, and power operated means for moving said additional parts of the idler roller into assembled relation with said centered parts thereby to complete the assembly of idler rollers of different lengths.

8. An idler roller assembling machine as set forth in claim 7 wherein power devices are mounted on said relatively adjustable end supports respectively for actuating said automatic centering devices.

OTTO P. HAEGELE.

References Cited in the file of this patent

UNITED STATES PATENTS

| Number | Name | Date |
|---|---|---|
| 577,015 | Eshman | Feb. 16, 1897 |
| 1,288,125 | Muller | Dec. 17, 1918 |
| 1,375,334 | Strong et al. | Apr. 19, 1921 |
| 1,451,381 | Tunnell | Apr. 10, 1923 |
| 1,462,305 | Snyder | July 17, 1923 |
| 1,663,499 | Hathaway | Mar. 20, 1928 |
| 1,881,533 | Hardiman | Oct. 11, 1932 |
| 1,899,325 | Hardman et al. | Feb. 28, 1933 |
| 1,944,360 | Meyer | Jan. 23, 1934 |
| 2,018,839 | Coughlin | Oct. 29, 1935 |
| 2,145,834 | Irven | Jan. 31, 1939 |
| 2,155,958 | Schmidt | Apr. 25, 1939 |
| 2,259,742 | Edison | Oct. 21, 1941 |
| 2,301,028 | Esch | Nov. 3, 1942 |
| 2,390,170 | Poole | Dec. 4, 1945 |
| 2,431,279 | Remington et al. | Nov. 18, 1947 |